(12) United States Patent
Chung et al.

(10) Patent No.: US 8,894,953 B2
(45) Date of Patent: Nov. 25, 2014

(54) CARBON DIOXIDE RECOVERY SYSTEM AND METHOD OF EXHAUST GAS

(75) Inventors: Sung Yeup Chung, Seoul (KR); Yoon Ji Lee, Gyeonggi-do (KR); Sang Jin Park, Gyeonggi-do (KR); Ki Chun Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 512 days.

(21) Appl. No.: 13/227,862

(22) Filed: Sep. 8, 2011

(65) Prior Publication Data

US 2013/0004406 A1    Jan. 3, 2013

(30) Foreign Application Priority Data

Jun. 29, 2011   (KR) .................. 10-2011-0064022

(51) Int. Cl.
 *B01D 53/62* (2006.01)
 *B01D 53/78* (2006.01)
 *B01D 53/96* (2006.01)
 *B01D 53/14* (2006.01)

(52) U.S. Cl.
 CPC ............ *B01D 53/1475* (2013.01); *Y02C 10/04* (2013.01); *Y02C 10/06* (2013.01); *B01D 2252/204* (2013.01); *B01D 53/1425* (2013.01); *B01D 2252/202* (2013.01)
 USPC .......................................... 423/220; 423/226

(58) Field of Classification Search
 None
 See application file for complete search history.

(56) References Cited

FOREIGN PATENT DOCUMENTS

| | | | |
|---|---|---|---|
| JP | 2000303582 A | 10/2000 | |
| JP | 2001047538 A | 2/2001 | |
| KR | 10-0946580 | 3/2007 | |
| KR | 10-0866768 | 9/2007 | |
| WO | WO 2011/069264 | * 6/2011 | ............ B01D 53/96 |

* cited by examiner

*Primary Examiner* — Stanley Silverman
*Assistant Examiner* — Daniel Berns
(74) *Attorney, Agent, or Firm* — Edwards Wildman Palmer LLP; Peter F. Corless

(57) ABSTRACT

Disclosed is a method for recovering carbon dioxide from exhaust gas, more particularly, a method for recovering carbon dioxide from exhaust gas for saving the cost for recovery of carbon dioxide by decreasing energy required for recycling a carbon dioxide absorbent solution. In particular, a circulating solvent, whose heat of vaporization and/or sensible heat is lower than that of a solvent of an absorbent solution introduced to a recycling tower, is supplied to the lower portion of the recycling tower and mixed with the heated absorbent solution. As a result, the pressure inside the recycling tower is maintained so that carbon dioxide released from the absorbent solution is discharged to a storage tank/drum.

3 Claims, 2 Drawing Sheets

CARBON DIOXIDE RECOVERY SYSTEM AND METHOD OF EXHAUST GAS

CROSS-REFERENCE TO RELATED APPLICATIONS

This application claims priority under 35 U.S.C. §119 to Korean Patent Application No. 10-2011-0064022, filed on Jun. 29, 2011, in the Korean Intellectual Property Office, the disclosure of which is incorporated herein by reference in its entirety.

BACKGROUND (a) Technical Field

The present invention relates to a system and method for recovering carbon dioxide from exhaust gas. More particularly, the present invention relates to a method for recovering carbon dioxide from exhaust gas for saving the cost for recovery of carbon dioxide by decreasing the energy required for recycling a carbon dioxide absorbent solution.

(b) Background Art

Korea is one of the chief greenhouse gas-emitting countries, which was ranked 6th in 2009 with 490 million tons of carbon dioxide emitted into the air. To cope with the global warming issue, the Korean government has implemented a plan to reduce greenhouse gas emissions by 30% by 2020 and has enacted the Framework Act on Low Carbon, Green Growth on Apr. 13, 2010.

Recognizing that the carbon capture and storage (CCS) technique will have a great impact on the reduction of greenhouse gas emission, the Korean government selected CCS as one of the 15 growth drivers and announced the National CCS Development & Promotion Plan in July 2010. According to this plan, carbon capture techniques will be developed and large-scale carbon dioxide ($CO_2$) storage sites will be explored in stages. By 2017, carbon capture and storage will be linked to store more than 1 million tons of carbon dioxide annually. To this end, the government and the related industries will invest about 2 trillion won for technical development in this area by 2020.

The existing methods for capturing carbon dioxide include absorption, adsorption, membrane separation, etc. Among them, the absorption method is evaluated economical and easily applicable compared with the adsorption or membrane separation methods, since it allows processing of a large quantity of exhaust gas and provides good carbon dioxide removal efficiency even when the carbon dioxide concentration is as high as 7-30%.

Among the existing absorption methods, chemical absorption, which is being developed widely, allows selective separation of carbon dioxide from exhaust gas using chemical reactions. Accordingly, it is advantageous in that $CO_2$ removal efficiency is high even when the partial pressure of $CO_2$ is low since the absorption amount is not greatly affected by the partial pressure of $CO_2$. However, it consumes a lot of energy during separation of the absorbent solution from $CO_2$.

In general, energy cost accounts for over 60% of the $CO_2$ recovery costs using the chemical absorption method. Of the energy cost, the cost spent for recycling of the $CO_2$ absorbent solution accounts for at least 80%. Accordingly, in order to reduce the recovery cost of carbon dioxide and improve the carbon dioxide absorption technique, a technique allowing the reduction of energy required for the recycling of the absorbent solution is necessary.

As seen from FIG. 1, in the existing carbon dioxide absorption technique, an exhaust gas containing carbon dioxide is supplied to an absorption tower 1 packed with a filler having a large surface area so as to allow efficient gas-to-liquid contact and is in contacted with an absorbent in solution state sprayed from the upper portion of the absorption tower 1 under atmospheric pressure at around 40-70° C. in order to absorb the $CO_2$ in the exhaust gas with the absorbent solution. The absorbent solution discharged from the absorption tower 1, i.e. the absorbent solution containing $CO_2$, is heated to about 100-160° C. and recycled in a recycling tower 3, preheated by the absorbent solution discharged from the lower portion of the recycling tower 3 via heat exchange, and then supplied to the upper portion of the recycling tower 3. In the lower portion of the recycling tower 3, the absorbent solution containing $CO_2$ is heated to 100-160° C. using a heater 4 such as a boiler to release $CO_2$ and then discharged in the upper portion of the recycling tower 3. The vaporized absorbent solution which is discharged together with the released $CO_2$ is cooled and condensed by a cooler 5, separated from carbon dioxide by a separation drum 6, refluxed to the recycling tower 3, and returned to the absorption tower 1 by being discharged in the lower portion of the recycling tower 3. The released, highly-concentrated (90-100%) $CO_2$ in a gaseous state is separately recovered from the separation drum 6 for storage/fixation/conversion.

As the absorbent for such chemical absorption, amine-based absorbent solutions are commonly used. Examples of the amine-based absorbent solution include monoethanolamine, diethanolamine, triethanolamine, ethyldiethanolamine, diisopropylamine, diglycolamine, piperazine, 2-piperazineethanol, hydroxyethylpiperazine, 2-amino-methyl-1-propanol, 2-ethylamino-ethanol, 2-methylamino-ethanol, 2-diethylamino-ethanol, and others. They are commonly used as mixed with a solvent such as water in concentrations of 5-60 wt %.

As described above, in the existing technique for recovering carbon dioxide from exhaust gas, energy cost accounts for over 60% of the $CO_2$ recovery cost, and the cost spent for recycling of the $CO_2$ absorbent solution by heating in the lower portion of the recycling tower accounts for about 80% of the total energy cost. Also, a lot of energy is consumed to separate $CO_2$ from the absorbent solution in order to recycle the absorbent solution, which further increases the cost for recovery of carbon dioxide.

That is to say, in the existing technique for recovering carbon dioxide, the absorbent solution containing that has absorbed $CO_2$ is heated within the recycling tower 3 to separate $CO_2$ and the absorbent solution is partly vaporized so as to elevate and maintain the pressure inside the recycling tower 3, so that the separated $CO_2$ can be effectively discharged from the recycling tower 3. The vaporized absorbent solution discharged together with $CO_2$ from the recycling tower 3 is cooled and condensed by the cooler 5, separated from $CO_2$ in the separation drum 6, and returned to the upper portion of the recycling tower 3 in liquid state. Since a lot of energy is consumed when partly vaporizing the absorbent solution, the energy cost is increased and the cost for recovery of carbon dioxide is also increased.

SUMMARY

The present invention is directed to providing a system and method for recovering carbon dioxide from exhaust gas which includes supplying a circulating solvent, whose heat of vaporization and/or sensible heat is lower than that of a solvent of an absorbent solution, to the lower portion of a recycling tower and mixing it with the heated absorbent solution, thereby maintaining the pressure inside the recycling tower to such an extent that the discharge of carbon dioxide released from the absorbent solution is possible.

In one general aspect, the present invention provides a system and a method for recovering carbon dioxide from exhaust gas comprising a circulating solvent whose heat of vaporization and/or sensible heat is lower than that of a solvent of an absorbent solution introduced to a recycling tower to the lower portion of the recycling tower and mixing it with the heated absorbent solution, thereby maintaining the pressure inside the recycling tower to such an extent that the discharge of carbon dioxide released from the absorbent solution is possible.

The circulating solvent may be discharged out of the recycling tower together with the carbon dioxide released from the absorbent solution, separated from the carbon dioxide by being cooled/condensed by a cooler at a separation drum, and returned to the lower portion of the recycling tower.

Specifically, the absorbent solution may be heated to about 85-140° C., and the circulating solvent may be selected from n-propanol and isopropyl alcohol.

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION OF MAIN ELEMENTS

Figure 1:
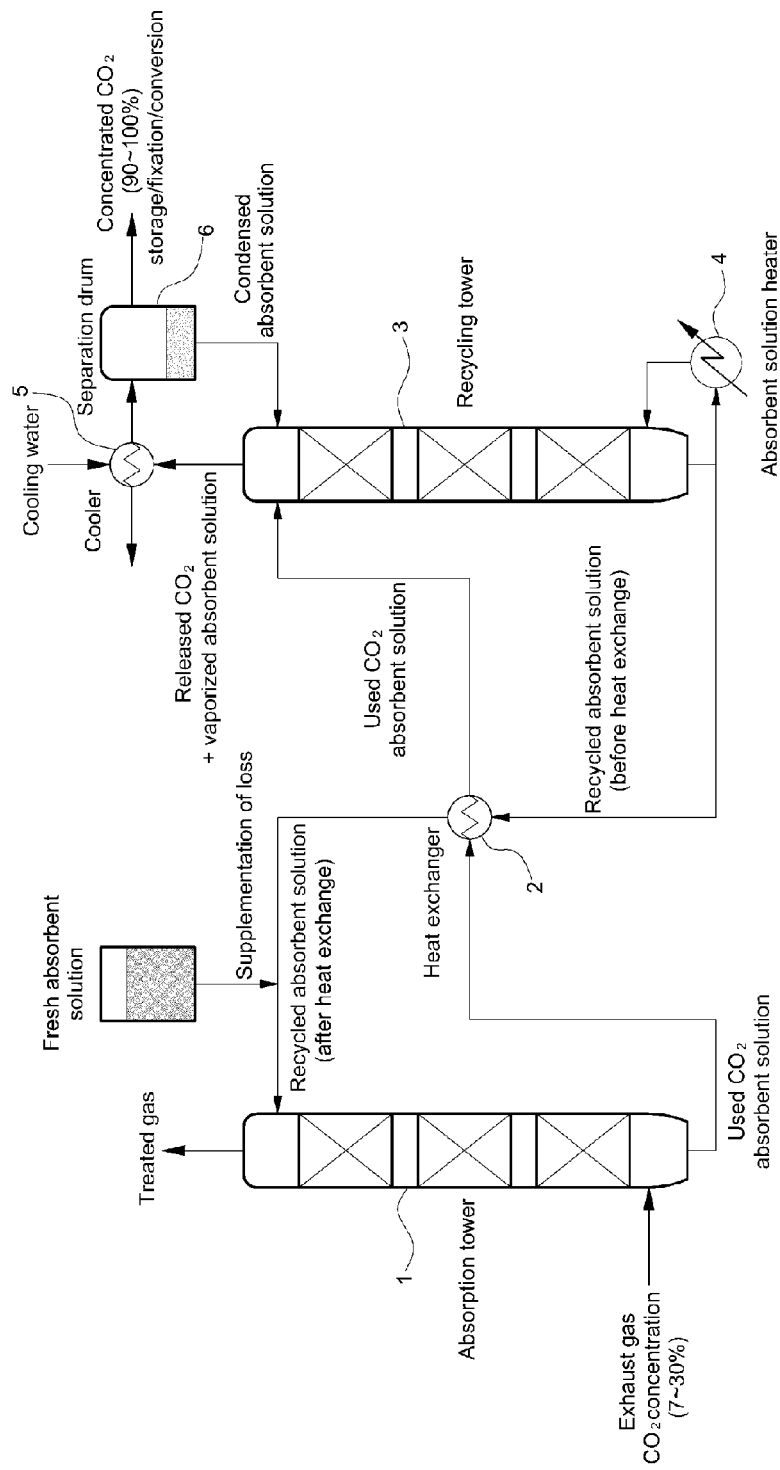
FIG. 1 schematically shows an existing process for recovering carbon dioxide from exhaust gas.

10: recycling tower
11: absorbent solution heater
12: cooler
13: separation drum It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

In the figures, reference numerals refer to the same or equivalent parts of the disclosure throughout the several figures of the drawings.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

A process for recovering carbon dioxide from exhaust gas according to the present invention can be largely divided into absorption of $CO_2$ at an absorption tower and recycling of an absorbent solution at a recycling tower.

In the process for recovering carbon dioxide according to the present invention, the energy required for recycling the absorbent solution used in the recycling tower is decreased to save the cost of recovery and recycling of carbon dioxide. The $CO_2$ absorption may be performed according to known methods.

The energy required for recycling the absorbent used to recover carbon dioxide can be divided into 3 kinds as follows:

1) Heat of desorption ($H_D$) required to chemically separate carbon dioxide from the absorbent 2) Sensible heat ($H_S$) required to raise temperature of the absorbent solution (e.g. to about 85-140° C.) without change of state 3) Heat of vaporization ($H_V$) required for vaporization of the absorbent solution That is, the required energy for recycling the absorbent is $H=H_D+H_S+H_V$.

As is generally known, in the carbon dioxide absorption process, an exhaust gas containing carbon dioxide is supplied to an absorption tower 1 packed with a filler having a large surface area so as to allow efficient gas-to-liquid contact and is contacted with an absorbent in solution state sprayed from the upper portion of the absorption tower 1 under atmospheric pressure at or around 40-70° C. in order to absorb the $CO_2$ in the exhaust gas with the absorbent solution (see FIG. 1).

Figure 2:
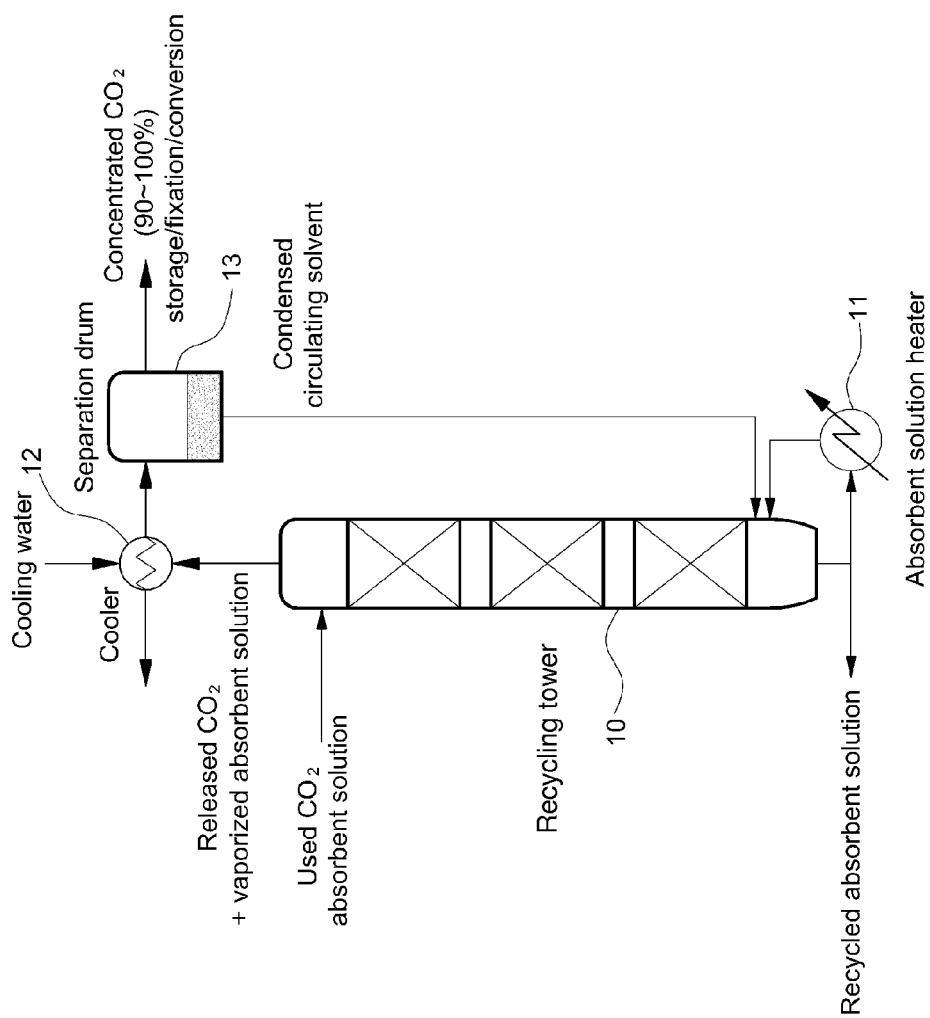
FIG. 2 schematically shows a process for recycling an absorbent solution in a process for recovering carbon dioxide from exhaust gas according to the present invention.

The absorbent solution discharged from the absorption tower 1, i.e. the absorbent solution containing $CO_2$, is introduced to the upper portion of a recycling tower 10, as shown in FIG. 2.

In the absorbent solution recycling process, the absorbent solution to be recycled is heated so that the absorbent solution is partly vaporized. By supplying a circulating solvent whose heat of vaporization and/or sensible heat is lower than that of a solvent of the absorbent solution to the lower portion of the recycling tower 10, the heating temperature may be lowered to about 85-140° C. and, thus, energy consumption can be decreased.

Specifically, in the absorbent solution recycling process, the absorbent solution containing $CO_2$, which is discharged from the absorption tower 1 and introduced in the upper portion of the recycling tower 10, is heated to about 85-140° C. in the lower portion of the recycling tower 10 using a heater 11 or waste heat to release carbon dioxide, as shown in FIG. 2. The released carbon dioxide is discharged in the upper portion of the recycling tower 10. In order to maintain the pressure inside the recycling tower 10 such that the carbon dioxide can be effectively discharged, the circulating solvent, whose heat of vaporization and/or sensible heat is lower than that of a solvent of the absorbent solution, is supplied to the lower portion of the recycling tower 10 to heat and vaporize the absorbent solution. The vaporized absorbent solution is discharged together with $CO_2$ in the upper portion of the recycling tower 10.

Since the heat of vaporization and/or sensible heat of the circulating solvent is lower than that of the absorbent solution, it is vaporized by the heat of the heated absorbent solution, resulting in increase of the pressure inside the recycling tower 10 and allowing the carbon dioxide released from the absorbent solution to be discharged. For example, in some embodiments of the present invention, the circulating solvent may be n-propanol or isopropyl alcohol.

The vaporized circulating solvent discharged from the upper portion of the recycling tower 10 together with carbon dioxide is cooled and condensed by a cooler 12 and introduced into a separation drum 13. In the separation drum 13, the circulating solvent is separated from carbon dioxide and returned to the lower portion of the recycling tower 10 in liquid state. The released, highly-concentrated (e.g., about 90-100%) $CO_2$ in a gaseous state is separately recovered from the separation drum 13 for storage/fixation/conversion.

The absorbent recycled in the lower portion of the recycling tower 10 may be selected considering, for example, the circulating solvent. But, the composition of the absorbent is not particularly limited.

More specifically, the circulating solvent supplied to the lower portion of the recycling tower 10 may be injected at an intermediate portion of the recycling tower 10, with an interval from the level of the absorbent solution in the lower portion of the recycling tower 10, or directly to the heated absorbent solution below the surface level of the absorbent solution, depending on the physical properties of the circulating solvent The recycled absorbent solution separated from carbon dioxide is discharged in the lower portion of the recycling tower 10 and recovered in the upper portion of the absorption tower. As such, in the method for recovering carbon dioxide according to the present invention, the absorbent to be recycled is heated to the temperature required to evaporate the circulating solvent whose heat of vaporization and/or sensible heat are lower than that of the solvent of the absorbent solution, rather than to the temperature required to partly evaporate the absorbent itself, so as to evaporate the circulating solvent supplied in the lower portion of the recycling tower, such that the pressure inside the recycling tower 10 is increased and maintained so that the carbon dioxide released from the absorbent is discharged out of the recycling tower 10 and the absorbent is recycled.

Accordingly, since it is unnecessary to evaporate the absorbent solution to increase and maintain the pressure inside the recycling tower 10 in order to discharge the carbon dioxide released from the absorbent out of the recycling tower 10, the energy required for heating the absorbent solution can be saved and, as a result, the energy cost can be reduced.

Furthermore, considering that the carbon dioxide absorbent solution may be partially oxidized by oxygen, sulfur dioxide, etc., or partially degraded at high temperature, the degree of oxidation and degradation of the absorbent solution may be suppressed by lowering the absorbent solution recycling temperature. Consequently, the cost of supplementing a fresh absorbent solution can be reduced by reducing the loss of the absorbent solution due to oxidation and thermal degradation.

EXAMPLES

The examples and experiments will now be described. The following examples and experiments are for illustrative purposes only and not intended to limit the scope of this invention.

Comparative Example 1

As an absorbent solution for absorbing carbon dioxide included in an exhaust gas, an absorbent solution comprising about 70% of water as an absorbent solvent and about 30% of a water-soluble amine was prepared.

The absorbent solution was heated in the lower portion of a recycling tower to about 117° C., such that about 30 kg of the absorbent solvent could be vaporized per 1 ton of carbon dioxide recovered.

The total energy required to recycle the absorbent solution is described in Table 1.

TABLE 1

|  | Heat of desorption | Sensible heat | Heat of vaporization |
|---|---|---|---|
| Percentage of total energy | 37 | 49 | 14 |

Example 1 n-Propanol was used as a circulating solvent in addition to the absorbent solution of Comparative Example 1.

Example 2

Isopropyl alcohol was used as a circulating solvent in addition to the absorbent solution of Comparative Example 1.

The recycling energy required to maintain the pressure inside the recycling tower at the same level using the absorbent solution and the circulating solvent (or absorbent solvent) of Comparative Example 1 and Examples 1 and 2 and the loss of the absorbent were measured. The result is shown in Table 3. The physical properties of each solvent are described in Table 2.

For reference, since amine boils above 150° C., the boiling point of each solvent increases when it is mixed with amine.

TABLE 2

|  | Water (absorbent solvent) | n-Propanol (circulating solvent) | Isopropanol (circulating solvent) |
|---|---|---|---|
| Boiling point (° C.) | 100 | 97 | 82.5 |
| Specific heat (J/g · ° C., 25° C.) | 4.18 | 1.42 | 2.56 |
| Heat of evaporation (J/g) | 2260 | 790 | 1360 |
| Temperature at lower portion of recycling tower | 117 | 110 | 98 |

TABLE 3

|  | Comp. Ex. 1 | Ex. 1 | Ex. 2 |
|---|---|---|---|
| Operation of recycling tower | 1) Heat absorbent to 117° C. | 1) Heat absorbent to 110° C. | 1) Heat absorbent to 100° C. |

TABLE 3-continued

|  | Comp. Ex. 1 | Ex. 1 | Ex. 2 |
| --- | --- | --- | --- |
|  | 2) Vaporize 30 kg of water per ton of $CO_2$ recovered | 2) Vaporize 30 kg of n-propanol per ton of $CO_2$ recovered | 2) Vaporize 30 kg of isopropanol per ton of $CO_2$ recovered |
| Recycling energy (GJ/ton $CO_2$ recovered) | 3.9 | 3.4 | 3.2 |
| Loss of absorbent | 1 (reference) | 0.8 | 0.6 |

As seen from Table 3, the recycling energy and the loss of the absorbent decreased in Examples 1 and 2 as compared to Comparative Example 1.

As described, the method and system for recovering carbon dioxide according to the present invention decreases the energy required for separating carbon dioxide from the absorbent solution and recycling the absorbent solution by lowering the heat of vaporization and the sensible heat.

Advantageously, the recycling energy required to evaporate the absorbent within the recycling tower can be decreased by supplying the circulating solvent whose heat of vaporization and/or sensible heat is lower than that of the solvent of the absorbent. Accordingly, the energy cost for recycling the absorbent and the cost for recovering carbon dioxide can be saved.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for recovering carbon dioxide from exhaust gas comprising:
    supplying a circulating solvent, whose heat of vaporization and/or sensible heat is lower than that of a solvent of an absorbent solution introduced to a recycling tower, to the lower portion of the recycling tower; and
    mixing the circulating solvent with a heated absorbent solution, wherein the absorbent solution is heated to about 110-140° C., and
    maintaining the pressure inside the recycling tower wherein carbon dioxide released from the absorbent solution is discharged.

2. The method for recovering carbon dioxide from exhaust gas according to claim 1, wherein the circulating solvent is discharged out of the recycling tower together with the carbon dioxide released from the absorbent solution, separated from the carbon dioxide by being cooled/condensed by a cooler at a separation drum, and returned to the lower portion of the recycling tower.

3. The method for recovering carbon dioxide from exhaust gas according to claim 1, wherein the circulating solvent is selected from a group consisting of n-propanol and isopropyl alcohol.

* * * * *